United States Patent
Kondareddy

(10) Patent No.: US 10,615,829 B1
(45) Date of Patent: Apr. 7, 2020

(54) SYSTEMS AND METHODS FOR ADJUSTING RECEIVE SENSITIVITY USING COLLOCATED COMMUNICATION CIRCUITRY

(71) Applicant: Cypress Semiconductor Corporation, San Jose, CA (US)

(72) Inventor: Raghunatha Kondareddy, Fremont, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 16/358,242

(22) Filed: Mar. 19, 2019

(51) Int. Cl.
  *H04B 17/00* (2015.01)
  *H04B 1/10* (2006.01)
  *H04B 1/00* (2006.01)

(52) U.S. Cl.
  CPC ......... *H04B 1/1027* (2013.01); *H04B 1/0082* (2013.01); *H04B 2001/1045* (2013.01)

(58) Field of Classification Search
  CPC ................ H04B 1/1027; H04B 1/0082; H04B 2001/1045
  USPC .................................. 455/246.1, 67.11, 115.1
  See application file for complete search history.

(56) References Cited

U.S. PATENT DOCUMENTS

| | | | | |
|---|---|---|---|---|
| 8,498,600 B2* | 7/2013 | Chan | .................... | H03G 3/3078 455/226.3 |
| 2002/0055335 A1* | 5/2002 | Wakabayashi | ......... | H04B 7/082 455/67.11 |
| 2005/0272377 A1* | 12/2005 | Oh | ........................ | H04W 24/00 455/67.14 |
| 2015/0009902 A1* | 1/2015 | Emmanuel | .......... | H04W 52/283 370/329 |

OTHER PUBLICATIONS

International Search Report for International application No. PCT/US2020/014020 dated Feb. 11, 2020, 2 pages.
Written Opinion of the International Searching Authority for International application No. PCT/US2020/014020 dated Feb. 11, 2020, 5 pages.

* cited by examiner

Primary Examiner — Sonny Trinh

(57) ABSTRACT

Example systems and methods of a wireless device use first communication circuitry of the wireless device to determine a first signal level associated with a first radio frequency signal and use second communication circuitry of the wireless device to determine a second signal level associated with a second radio frequency signal. Systems and methods generate a sensitivity adjustment value based on the first signal level and the second signal level, and use the sensitivity adjustment value to process a combined signal comprising the first radio frequency signal and the second radio frequency signal.

18 Claims, 9 Drawing Sheets

| BLOCKING SIGNAL LEVEL | WANTED SIGNAL LEVEL | SENSITIVITY ADJUSTMENT |
|---|---|---|
| STRONG | STRONG | LARGE |
| STRONG | MID | MEDIUM |
| STRONG | WEAK | NONE |
| MID | STRONG | LARGE |
| MID | MID | SMALL |
| MID | WEAK | NONE |
| WEAK | STRONG | NONE |
| WEAK | MID | NONE |
| WEAK | WEAK | NONE |

SYSTEMS AND METHODS FOR ADJUSTING RECEIVE SENSITIVITY USING COLLOCATED COMMUNICATION CIRCUITRY

TECHNICAL FIELD

The subject matter relates to the field of wireless communications. More specifically, but not by way of limitation, the subject matter discloses techniques for adjusting receive sensitivity using collocated communication circuitry.

BACKGROUND

Some communication systems include communication circuitry to transfer data in accordance with one or more wireless communications protocols. For example, a communication system may include a radio that utilizes Wireless Local Area Network (WLAN) communication protocol (e.g., Wi-Fi based on IEEE 802.11 standards), a radio that utilizes Bluetooth (BT) communication protocol (e.g., based on BT SIG standards), and/or a radio that utilizes Zigbee (ZB) communication protocol (e.g., based on IEEE 802.15.4 standards), where the radios are all in close proximity to one another. Radio frequency (RF) signals transmitted according to one communication protocol (e.g., blocking signals) can interfere with the communication system's ability to accurately decode of RF signals transmitted according to another communication protocol (e.g., wanted signals).

BRIEF DESCRIPTION OF THE DRAWINGS

Some embodiments are illustrated by way of example and not limitation in the figures of the accompanying drawings in which:

FIG. 5 is a chart diagram showing sensitivity adjustments corresponding to received signal level ranges, in accordance with embodiments;

DETAILED DESCRIPTION

Figure 1:
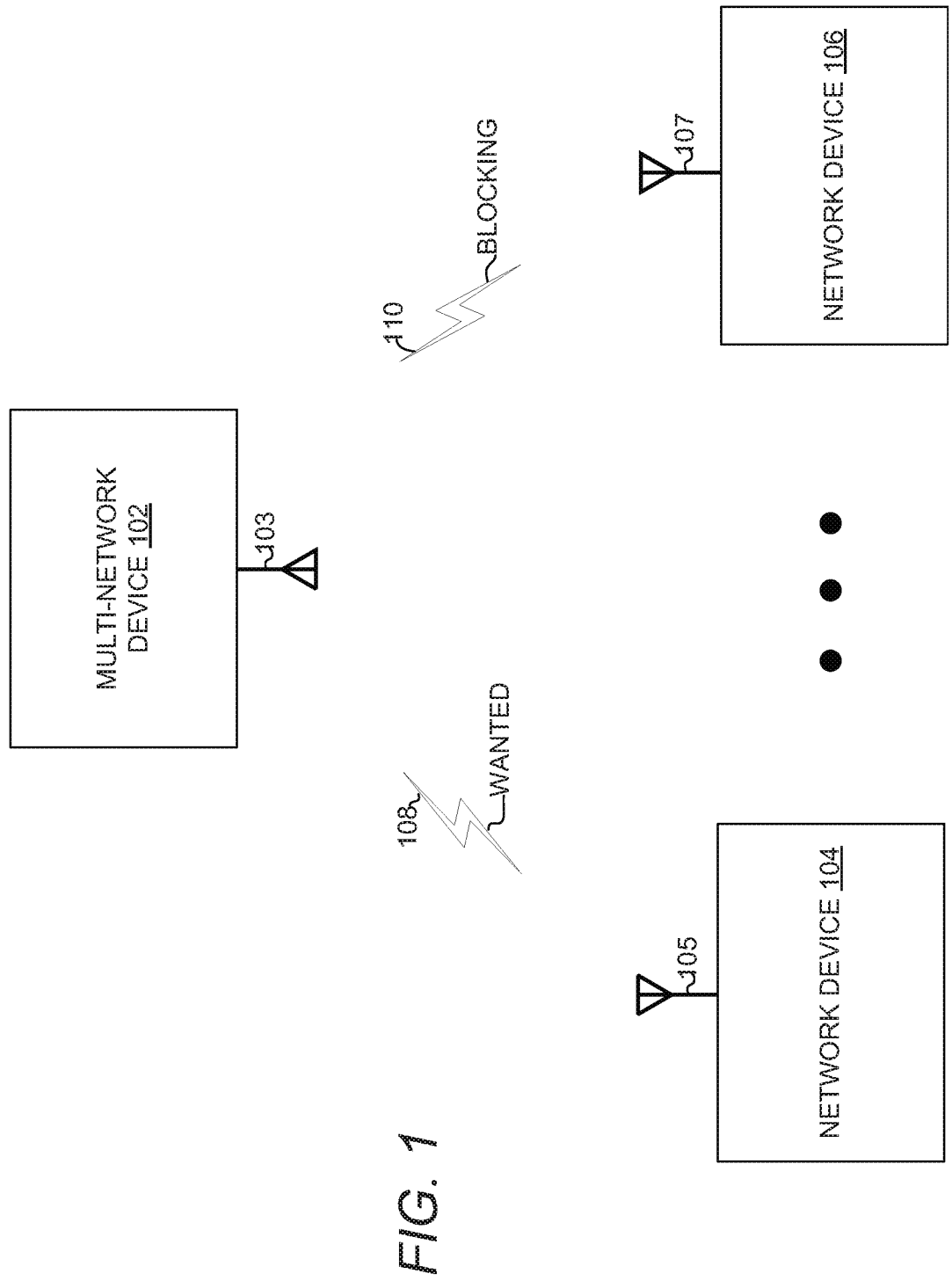
FIG. 1 is a block diagram illustrating a multi-network device exposed to wanted RF signals and blocking RF signals, in accordance with embodiments.

Systems and methods for adjusting receive sensitivity using collocated communication circuitry is described. In the following description, for purposes of explanation, numerous examples and embodiments are set forth in order to provide a thorough understanding of the claimed subject matter. It will be evident to one skilled in the art that the claimed subject matter may be practiced in other embodiments. Some embodiments are now briefly introduced and then discussed in more detail along with other embodiments beginning with FIG. 1.

Communication circuitry configured operate according to a particular communication protocol (e.g., a BT communication protocol) may operate in an environment where its antenna is exposed to wanted RF signals (e.g., BT signals) and blocking RF signals (e.g., WLAN signals). In general, the wanted RF signals may encode data meant to be received by the communication circuitry and the blocking RF signals interfere with the communication circuitry's ability to successfully decode the data from the wanted signals. For example, blocking RF signals in an adjacent channel of an overlapping frequency spectrum (e.g., WLAN, BT, and ZB in 2.4 GHz range) and/or in an adjacent frequency spectrum (e.g., cellular such as Long-Term Evolution (LTE) band 7 and band 40) relative to the wanted RF signals can cause frequency, intermodulation and/or harmonic interference. Since decoding errors can hinder successful re-assembly of packets encoded in the wanted RF signals, blocking RF signals can significantly increase a communication circuitry's packet error rate (PER).

Embodiments described herein mitigate the effects of blocking RF signals on a communication circuitry's ability to successfully receive packets encoded in wanted RF signals. In an embodiment, a network device includes BT communication circuitry on an IC that is disposed on a printed circuit board. The BT communication circuitry includes receive circuitry and a sensitivity adjustor. The sensitivity adjustor is to generate a first sensitivity adjustment value based on a received signal strength indicator (RSSI) value associated with a BT signal (e.g., a wanted signal) and another RSSI value associated with a WLAN signal (e.g., a blocking signal). In embodiments, the sensitivity adjustor uses the first sensitivity adjustment value to cause a first sensitivity of the receive circuitry to the BT signal. Based on the receive circuitry operating according to the first sensitivity, the BT communication circuitry is configured to demodulate the BT signal to generate one or more BT packets.

WLAN communication circuitry to transmit and receive WLAN packets may be another integrated circuitry chip disposed on the printed circuit board. In embodiments, WLAN RSSI circuitry of the WLAN communication circuitry is utilized to provide the WLAN RSSI values (e.g., associated with the blocking signals) for use by the sensitivity adjustor in generating the sensitivity adjustment values. In various embodiments, the BT communication circuitry and the WLAN communication circuitry may be coupled to one or more common or separate antennas that pick up the wanted signal and/or blocking signals.

The signal strengths (e.g., or other attributes) of the BT signal and the WLAN signal may be used to determine if a sensitivity adjustment should even be made. In embodiments, the sensitivity adjustor adjusts an existing receive sensitivity of the receive circuitry based on determining that the RSSI value associated with the BT signal meets or exceeds a wanted signal level threshold and that the RSSI value associated with the WLAN signal meets or exceeds a blocking signal level threshold. On the other hand, the sensitivity adjustor will maintain an existing receive sensitivity based on determining that the RSSI value associated with the BT signal does not meet a wanted signal level threshold or that the RSSI value associated with the WLAN signal does not meet a blocking signal level threshold.

As the attributes of the BT signal and/or the WLAN signal change, the sensitivity adjustor may dynamically adjust the sensitivity of the receive circuitry. For example, the sensitivity adjustor may generate a second sensitivity adjustment value based on a second RSSI value associated with the BT signal and a second RSSI value associated with the WLAN signal. The sensitivity adjustor may use the second sensitivity adjustment value to cause a second sensitivity of the receive circuitry to the BT signal.

The sensitivity adjustor may generate the sensitivity adjustment value by accessing one or more data structures (e.g., look-up tables) that associate sensitivity adjustment values with corresponding RSSI values for BT signals (e.g., or other wanted signal attribute values) and RSSI values for WLAN signals (e.g., or other blocking signal attribute values). Alternatively or additionally, the sensitivity adjustor may compute sensitivity adjustment values based on the signal attribute values using a sensitivity adjustment equation.

For some embodiments, the sensitivity adjustment value is a gain adjustment value applied to the BT receiver. The BT receiver may include one or more amplifiers (e.g., LNAs) that apply a gain to a combined RF signal (e.g., including the BT signal and the WLAN signal) and automatic gain control (AGC) logic coupled to the one or more amplifiers to set the gain in the one or more amplifiers. In embodiments, the sensitivity adjustor provides the gain adjustment value to the AGC logic to vary the one or more gain values applied by the one or more amplifiers.

Through the embodiments described herein, capabilities of collocated communication circuitry can be utilized to mitigate blocking RF signal effect on the PER associated with wanted RF signals. With lower PER comes lower power consumption as subsequent transmit and receive processing associated with retransmission requests can be avoided.

The detailed description below includes references to the accompanying drawings, which form a part of the detailed description. The drawings show illustrations in accordance with embodiments. These embodiments, which are also referred to herein as "examples," are described in enough detail to enable those skilled in the art to practice embodiments of the claimed subject matter. The embodiments may be combined, other embodiments may be utilized, or structural, logical, and electrical changes may be made without departing from the scope of what is claimed. The following detailed description is, therefore, not to be taken in a limiting sense, and the scope is defined by the appended claims and their equivalents.

FIG. 1 is a block diagram illustrating a multi-network device 102 exposed to wanted RF signals 108 and a blocking RF signals 110, in accordance with embodiments. In embodiments, one or more antennas 103 of the multi-network device 102 pick-up the wanted RF signals 108 and the blocking RF signals 110 transmitted by the network device 104 and the network device 106, respectively. In embodiments, the wanted RF signal 108 and the blocking RF signal 110 are transmitted according to different communication protocols.

In an embodiment, the multi-network device 102 is capable of wirelessly communicating using the wireless communication protocol associated with the wanted RF signal 108 and also the wireless communication protocol associated with the blocking RF signal 110. Wireless communication protocols associated with the wanted RF signal 108, the blocking RF signal 110, and used by the multi-network device 102 may include without limitation WLAN, BT, and ZB (e.g., in the 2.4 GHz range) and/or cellular protocols such as LTE band 7 and band 40 (e.g., in adjacent frequency spectra). In some embodiments, the multi-network device 102 is capable of wirelessly communicating (e.g., transmitting and/or receiving packets) according to the communication protocol of the wanted RF signal 108 and is capable of determining an attribute of the blocking RF signal 110, but is not fully capable of wirelessly communicating (e.g., transmitting and/or receiving packets) according to the communication protocol the blocking RF signal 110.

Network device 104 is capable of transmitting the wanted RF signals 108 via antenna(s) 105 according to a wireless communication protocol used by the multi-network device 102. Network device 106 is capable of transmitting the blocking RF signals 110 via antenna(s) 107 according to a wireless communication protocol that is different from that of the wanted RF signal 108.

In embodiments, the wanted RF signals 108 encode packets according to a wireless communication protocol used by the multi-network device 102. In embodiments, the multi-network device 102 may be expecting the wanted RF signals 108 transmitted by the network device (e.g., because of an existing network connection) or may otherwise be capable of decoding the wanted RF signals 108. The blocking RF signals 110 may be unexpectedly received or may be received concurrently with the wanted RF signals 108 such that the blocking RF signal 110 becomes a noise signal that interfere with the multi-network device's 102 ability to decode the wanted RF signals 108. For example, the multi-network device 102 may not expect blocking RF signals 110 that are unilaterally transmitted or broadcasted by the network device 106. Although only one network device 106 is shown to provide blocking RF signals 110, other network devices (not shown) may transmit blocking signals that interfere with wanted RF signals 108. In embodiments, both the network device 104 and the network device 106 may sometimes transmit a wanted RF signal and at other times transmit a blocking RF signal.

In embodiments described herein, the multi-network device 102 includes inventive technology to mitigate the noise (e.g., interference) caused by blocking RF signals that hinder decoding of wanted RF signals. Example communication circuitry of the multi-network device 102 that can mitigate blocking signal noise is described with respect to FIG. 2.

Figure 2:
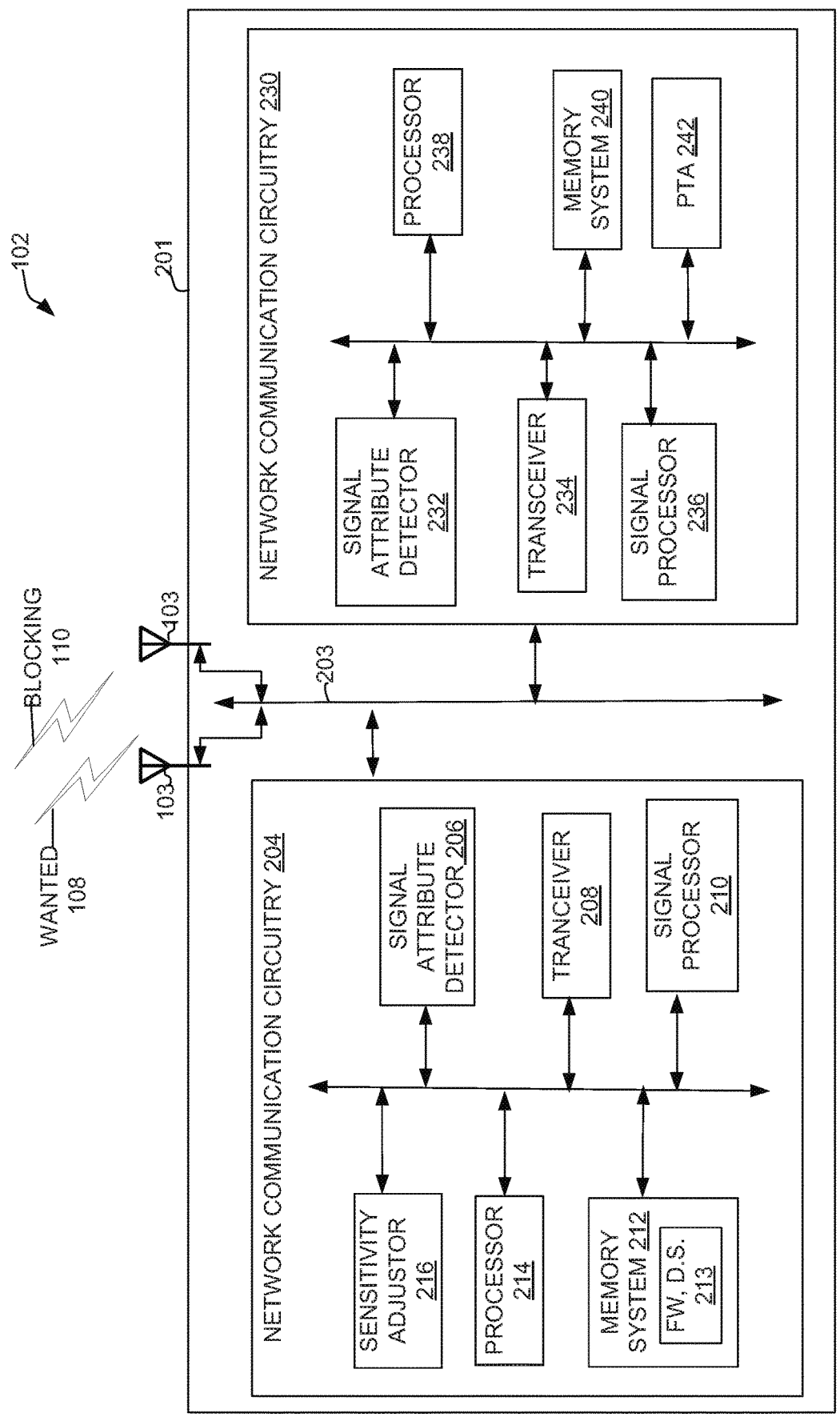
FIG. 2 is a block diagram illustrating communication circuitry of a multi-network device, in accordance with embodiments.

FIG. 2 is a block diagram illustrating communication circuitry 204 and 230 of the multi-network device 102, in accordance with embodiments. The multi-network device 102 is shown to include a substrate 201 including network communication circuitry 204 coupled to network communication circuitry 230 via bus system 203. The bus system 203 may include inter-chip busses, intra-chip busses, coexistence busses, or any other communication line to connect circuits and/or logic blocks. The communication circuitry 204 and the communication circuitry 230 may be disposed on an IC chip or disposed on discrete IC chips.

The multi-network device 102 may include or be coupled to antennas 103. For example, in some embodiments, the multi-network device 102 may be coupled to one or more antenna arrays (e.g., a phased array) and/or an antenna cluster including any number of antennae (e.g., six or eight) exclusively paired with or shared among communication circuitry 204 and/or 230. In other embodiments, the multi-network device 102 may include one antenna shared among the network communication circuitry 204 and 230.

In an embodiment, the multi-network device 102 may be a system on a chip that includes BT communication circuitry coupled via coexistence interface(s) to WLAN communication circuitry. Other embodiments of the multi-network device 102 may include a set of more than two network communication circuitries. For example the printed circuit board 201 may include one or more ICs that implement BT communication circuitry, WLAN communication circuitry, and ZB communication circuitry coupled to one another via one or more coexistence interfaces. In embodiments, collaborative coexistence hardware mechanisms and algorithms enable communication subsystems to operate concurrently and/or simultaneously.

In embodiments, the communication circuitry 204 and the communication circuitry 230 communicate using overlapping frequency spectra (e.g., WLAN, BT, and ZB in 2.4 GHz range) and/or using adjacent frequency spectra (e.g., cellular protocols such as LTE band 7 and band 40).

The network communication circuitry 204 is shown to include a processor 214, a memory system 212, a signal attribute detector 206, a transceiver 208, a signal processor 210, and a sensitivity adjustor 216, which are each discussed in more detail below. In embodiments, the processor 214 and the memory system 212 are used to execute communication circuitry 204 operations based on instructions (e.g., firmware or microcode) and/or data structures 213 organized within the memory system 212.

In embodiments, the processor 238, memory system 240, signal attribute detector 232, transceiver 234, and signal processor 236 of the network communication circuitry 230 may be the same or similar to those of the network communication circuitry 204. In some embodiments, the network communication circuitry 230 may also include a sensitivity adjustor (not shown) that operates similarly to the sensitivity adjustor 216 described below. Packet transfer arbitration (PTA) logic 242 of the network communication circuitry 230 can facilitate coexistence among the network communication circuitry 204 and the network communication circuitry 230 via the bus system 203 by deciding which communication subsystem should be granted access to the transmission medium during a particular period in order to maintain acceptable operating ranges and throughput. Arbitration algorithms utilized by the PTA logic 242 may include, without limitation, IEEE 802.15.2 Packet Traffic Arbitration.

Collaborative coexistence techniques provide a methodology by which communication circuitry for multiple communication protocols can be collocated on a device (e.g., a small form-factor device). Coexistence solutions can be implemented at the chip level, the board level, the software level (e.g., firmware), and/or through antennas. In example embodiments, mitigation of coexistence problems may be achieved by optimizing hardware such as board layout of RF signal routing and component placement, e.g., antenna isolations, cellular RF and RFIC components, WLAN, BT, global positioning system (GPS), and ZB RFIC and RF components, and by using filters in the receivers and transmitters. Coexistence solutions may also be achieved through PHY/Software optimization such as time domain multiplexing of radios with time synchronization of radio frames using, for example, 2-wire and/or 3-wire coexistence interfaces. In an embodiment, collaborative coexistence between WLAN, BT, and ZB subsystems may be implemented by the PTA using PTA's prioritization approaches between data types and applications and/or other arbitration algorithms to pursue optimum performance for the particular circumstances and design constraints of the multi-network communication system. Through PTA embodiments described herein, overall quality for simultaneous voice, video, and data transmission on an embedded system can be achieved.

Although embodiments of the network communication circuitry 230 are described to have a level of communication capabilities (e.g., transmit, receive, etc.), in other embodiments, the network communication circuitry 230 may be limited to detecting attributes associated with blocking RF signals 110 for use in decoding wanted RF signals 108 (e.g., described in more detail below).

The signal attribute detector 206 and the signal attribute detector 232 are each operably coupled to one or more of the antennas 103 to detect an attribute associated with received RF signals. Attributes associated with RF signals may include, without limitation, signal frequency, angular frequency, amplitude, phase, wavelength, wave speed, time of arrival, time difference of arrival, phase difference, phase difference of arrival, signal quality (e.g., an Exponential Effective SNR Mapping (EESM) value), signal strength (e.g., RSSI value), and/or any other attribute combinations or derivatives thereof. In embodiments, the signal attribute detector 206 of the network communication circuitry 204 detects one or more attributes associated with the wanted RF signals 108 signal while signal attribute detector 232 of the network communication circuitry 230 detects one or more attributes associated with the blocking RF signals 110.

The signal attribute detectors 206 and 232 are to provide the detected signal attributes to the sensitivity adjustor 216 for use in adjusting receive sensitivity of the network communication circuitry 204. In some embodiments, one or more of the signal attribute detectors 206 and 232 receive attribute information from the transceiver 208 and/or the transceiver 234 and may determine or estimate attributes associated with an RF signal using the attribute information (e.g., based on measurements or samples taken at one or more points along the receive path). Alternatively or additionally, one or more of the signal attribute detectors 206 and 232 may include analog and/or digital logic and/or measurement circuitry to determine or estimate attributes associated with RF signals attributes. Although shown as being separate circuitry, embodiments may include a signal attribute detector implemented in whole or in part by a transceiver, signal processor, and/or by a processor processing instructions stored in a memory system.

In some embodiments, the signal attribute detector 206 and the signal attribute detector 232 use techniques known in the art to detect an RSSI value associated with an RF signal transmitted according to a communication protocol. For example the network communication circuitry 204 may identify the wanted RF signal 108 based on packet header information (e.g. BT packet) obtained by a PHY (not shown) of the transceiver 208. The packet header information identifies the communication protocol (e.g., BT communication protocol) used by the network communication circuitry 204 to receive packets. The signal attribute detector 206 may then calculate RSSI values for RF signals identified as wanted RF signals 108. Similarly, the network communication circuitry 230 may identify the blocking RF signal 110 based on packet header information (e.g., WLAN packet) obtained by a PHY of the transceiver 234. The packet header information identifies the communication protocol (e.g., WLAN communication protocol) used by the network communication circuitry 230 (e.g., and not used by the network communication circuitry 204) to receive packets. The signal attribute detector 232 may then calculate RSSI values for the RF signals identified as blocking RF signals 110.

The transceiver 208 is shown to be coupled with antennas 103 and facilitates transmitting and receiving of RF signals according to the communication protocol associated with the wanted RF signals 108. Although a transceiver 208 is shown and described, some embodiments may only include receive circuitry to receive wanted RF signals 108. Example receive circuitry is described in further detail below with respect to FIG. 3.

In embodiments, when operating as a receiver, the transceiver 208 processes received RF signals in the analog domain, digitizes them, and demodulates corresponding digital data to provide a decoded sequence of 1s and 0s to the signal processor 210 for further processing (e.g., packet processing). When operating as a transmitter, the transceiver 208 generally performs the operations in reverse, receiving a sequence of 1s and 0s from the signal processor 210, modulating the signal, and outputting an analog signal for transmission by an antennas 103.

The signal processor 210 provides packet processing in accordance with the communication protocol supported by the network communication circuitry 204. For example, the signal processor 210 may execute software and/or algorithms to process various layers of a protocol stack to implement a communication protocol such as Wi-Fi, BT, ZB, or any other communication protocol.

When received RF signals include a mix of wanted RF signals 108 and blocking RF signals 110, the transceiver 208 may generate a flawed sequence of 1s and 0s that does not correspond to the sequence of 1s and 0s encoded in the wanted RF signals 108. Based on the flawed sequence of 1s and 0s, the signal processor 210 cannot accurately reassemble a packet resulting in a packet error. Thus, the existence of the blocking RF signal 110 at the antennas 103 may result in an increased PER, requiring retransmissions, and ultimately increased power consumption by the multi-network device 102 due to repeated re-transmission request and packet reassembly attempts.

The sensitivity adjustor 216 is to mitigate the harmful effects of the blocking RF signals. The sensitivity adjustor 216 may be implemented by processor 214 execution of instructions (e.g., microcode, firmware) and/or data structures 213 stored in the memory system 212, dedicated circuitry, or a combination. In embodiments, the sensitivity adjustor 216 uses detected attribute values to make adjustments to analog signals and/or corresponding digital data to avoid packet errors that would otherwise occur. In various embodiments, the sensitivity adjustor 216 may continuously or periodically (e.g., at a predetermined rate) monitor or request attribute values detected by the signal attribute detectors 206 and 232.

The sensitivity adjustor 216 may access one or more data structures 213 (e.g., a look-up table) in the memory system 212 to determine a sensitivity adjustment value that corresponds to the detected attribute values associated with the wanted RF signal 108 and/or the blocking RF signal 110. The sensitivity adjustor 216 may also compute sensitivity adjustment values based on attribute value inputs using a linear or non-linear sensitivity adjustment function or equation. The sensitivity adjustor 216 can dynamically determine or compute sensitivity adjustment values according to a predetermined timing. In embodiments, the timing may be adjusted based on expected network environment conditions.

The sensitivity adjustor 216 may cause a sensitivity adjustment by adjusting the frequency or amplitude of local oscillator signals and/or by adjusting the pass band of filters in receive circuitry. As will be described in more detail with respect to FIG. 3, the sensitivity adjustment may include adjusting the gain applied by one or more amplifiers to RF signals including concurrently received wanted RF signals 108 and blocking RF signals 110. Alternatively or additionally, the sensitivity adjustor 216 may achieve the same or similar results by making adjustments to digital data processed by the transceiver 208 or the signal processor 210.

Figure 3:
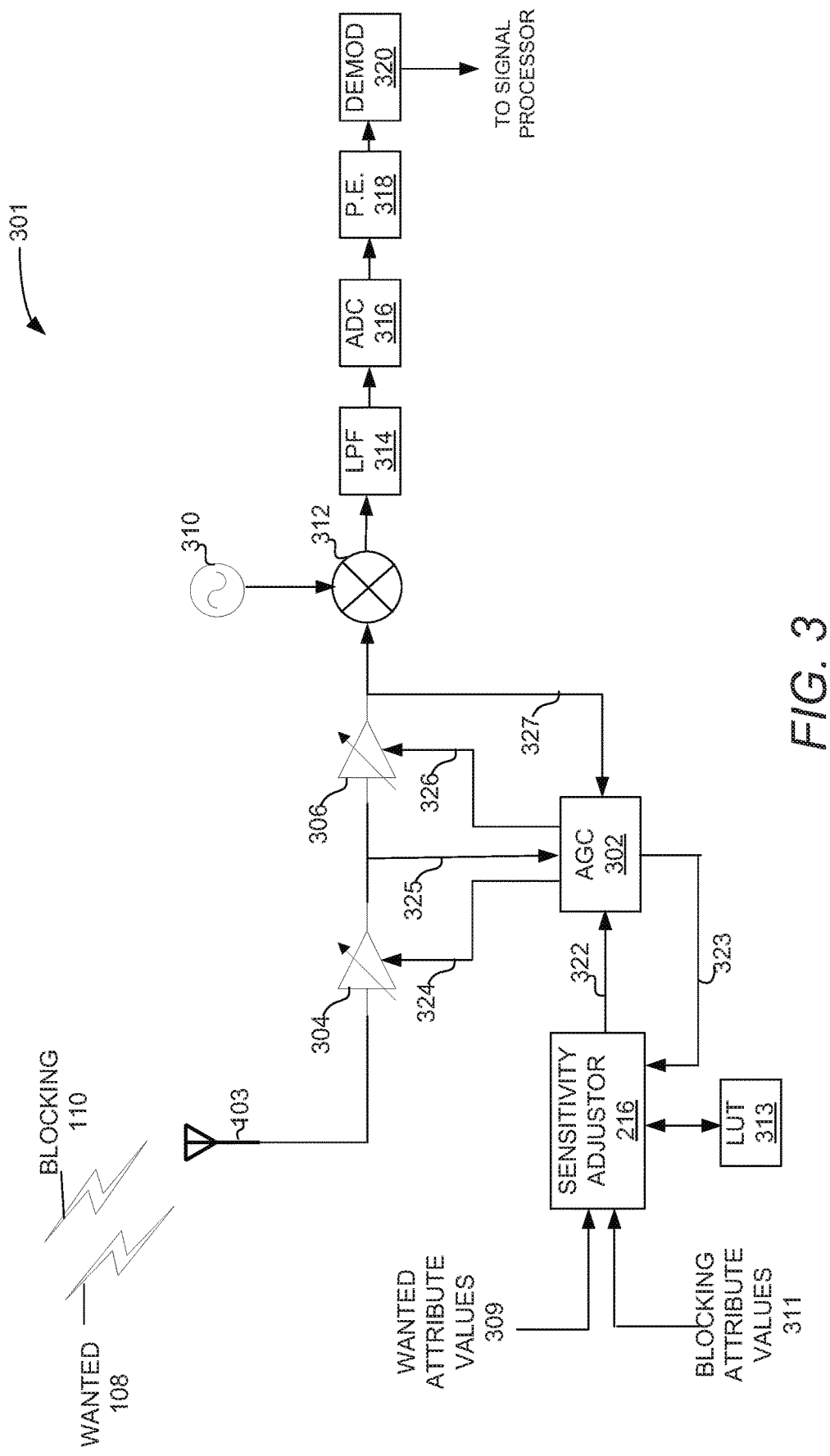
FIG. 3 is a block diagram showing a sensitivity adjustor of communication circuitry 204 coupled to receive circuitry of a transceiver, in accordance with embodiments.

FIG. 3 is a block diagram showing the sensitivity adjustor 216 of the network communication circuitry 204 coupled to receive circuitry 301 of the transceiver 208, in accordance with embodiments. In embodiments, the receive circuitry 301 includes amplifiers 304 and 306 to amplify RF signals received through the antenna 103. The receive circuitry 301 may include any number of amplifiers without departing from the claimed subject matter. In embodiments, the RF signals processed by the receive circuitry 301 include the wanted RF signals 108 and the blocking RF signals 110.

The amplifiers 304 and 306 may include low noise amplifiers (LNAs). In embodiments, LNAs amplify the wanted RF signals 108 and the blocking RF signals 110 based on the amplifiers' respective gain settings. Automatic gain control (AGC) logic 302 may be a regulating circuit that provides gain adjustment signals 324 and/or 326 to dynamically control the gain of amplifiers 304 and/or 306 to maintain sufficient RF signal amplitude at the output of amplifiers 304 and/or 306, such that a range of RF signal amplitudes at the input can be used. In an embodiment, an average or peak RF signal level output from each amplifier 304 and/or 306 may be provided as feedback 325 and/or 327 to the AGC 302.

As described with respect to FIG. 2, the sensitivity adjustor 216 may access a LUT 313 to provides a sensitivity adjustment values 322 based on attribute values 309 associated with the wanted RF signal 108 and attribute values 311 associated with the blocking RF signal 110. As shown in FIG. 3, the sensitivity adjustor 216 provides the sensitivity adjustment values 322 to the AGC 302. The AGC 302 uses the adjustment values 322 to generate gain adjustment signals 324 and/or 326 that adjust the gain applied by the amplifiers 304 and/or 306. The sensitivity adjustor 216 may generate the sensitivity adjustment value 322 further based on gain values provided as feedback 323 from the AGC 302.

The mixer 312 mixes amplified RF signals with a signal from local oscillator 310 to down-convert a desired frequency (e.g., or channel) of the RF signal to an intermediate frequency (IF) signal. In an embodiment, the down-conversion process provides complex I and Q signals which are filtered by the filter 314 before being sampled and digitized by analog-to-digital converter (ADC) 316. In an embodiment, the filter 314 includes a low pass filter that passes IF signals with a frequency lower than a selected cutoff frequency and attenuates IF signals with frequencies higher than the cutoff frequency. A phase estimator 318 may perform calculations to estimate the phase of the RF signal for the time it was received at the antenna using the I and Q values, and forward the phase value to a demodulator 320, which then forwards a decoded sequence of 1s and 0s to the signal processor for further processing (e.g., packet processing).

Figure 4:
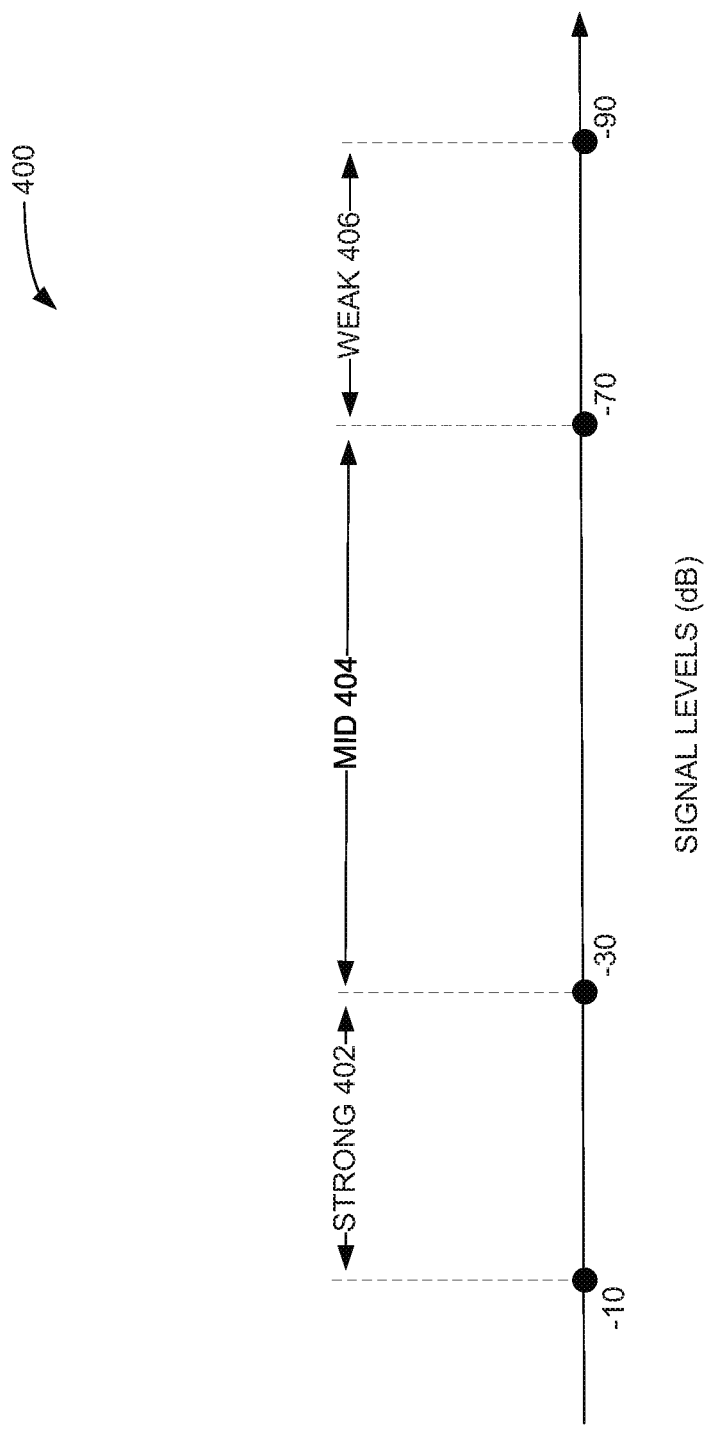
FIG. 4 is a chart diagram showing example RF signal level ranges, in accordance with embodiments.

In embodiments, the attributes associated with the wanted RF signal 108 and the blocking RF signal 110 include their respective RF signal levels (e.g., RSSI values). FIG. 4 is a chart diagram 400 showing example RF signal level ranges, in accordance with embodiments. The RF signal level ranges are organized into strong 402, mid 404, and weak 406 RF signal level ranges. For example, a wanted RF signal or blocking RF signal having an RSSI value between −10 dB and −30 dB is considered to be a strong RF signal level in the strong range 402; a wanted RF signal or blocking RF signal having an RSSI value between −30 dB and −70 dB is considered to be a mid RF signal level in the mid-range 404; and a wanted RF signal or blocking RF signal having an RSSI value between −70 dB and −90 dB is considered to be a weak RF signal level in the weak range 406.

In embodiments, the sensitivity adjustor 216 provides sensitivity adjustment values based on the RSSI values of both the wanted RF signal and the blocking RF signal meeting or exceeding a signal level threshold. For example, if either of the RSSI values do not meet or exceed a signal level threshold value of −70 dB (e.g., an RSSI value in the weak range), the sensitivity adjustor will not generate a sensitivity adjustment value that changes receiver sensitivity. In some embodiments, strong, mid, and weak ranges, and the signal level threshold of the wanted RF signals may be defined to be different from one or more of the strong, mid, weak ranges, and the signal level threshold defined for the blocking RF signals.

FIG. 5 is a chart diagram 500 showing sensitivity adjustments corresponding to received signal level ranges, in accordance with embodiments. As discussed with respect to FIG. 4, the detected blocking signal levels and the wanted signal levels may fall within one of the strong 402, mid 404, or weak 406 signal level ranges, respectively. The corresponding sensitivity adjustment values may be considered large, medium, small, or none. In an embodiment, small sensitivity adjustments cause an effective gain adjustment to one or more amplifiers of up to 10 dB; medium sensitivity adjustments cause an effective gain adjustment from greater than 10 dB to 15 dB; and large sensitivity adjustments cause an effective gain adjustment from greater than 15 dB to 25 dB. In an embodiment, an effective gain adjustment may be achieved by distributing gain adjustments among amplifiers.

As earlier described, the sensitivity adjustor 216 may access data structures organized memory that store the blocking signal levels, wanted signal levels, and corresponding sensitivity adjustments. The resolution in decibels of the stored values as well as the access frequency may be selected to meet accuracy and power consumption performance targets. In addition, the resolution of strong signal level values, mid signal level values, and weak signal level values may be the same or different. An example of adjusting receive sensitivity of receive circuitry based on a mid-range wanted signal level and a strong-range blocking signal level is described with respect to FIG. 6.

Figure 6:
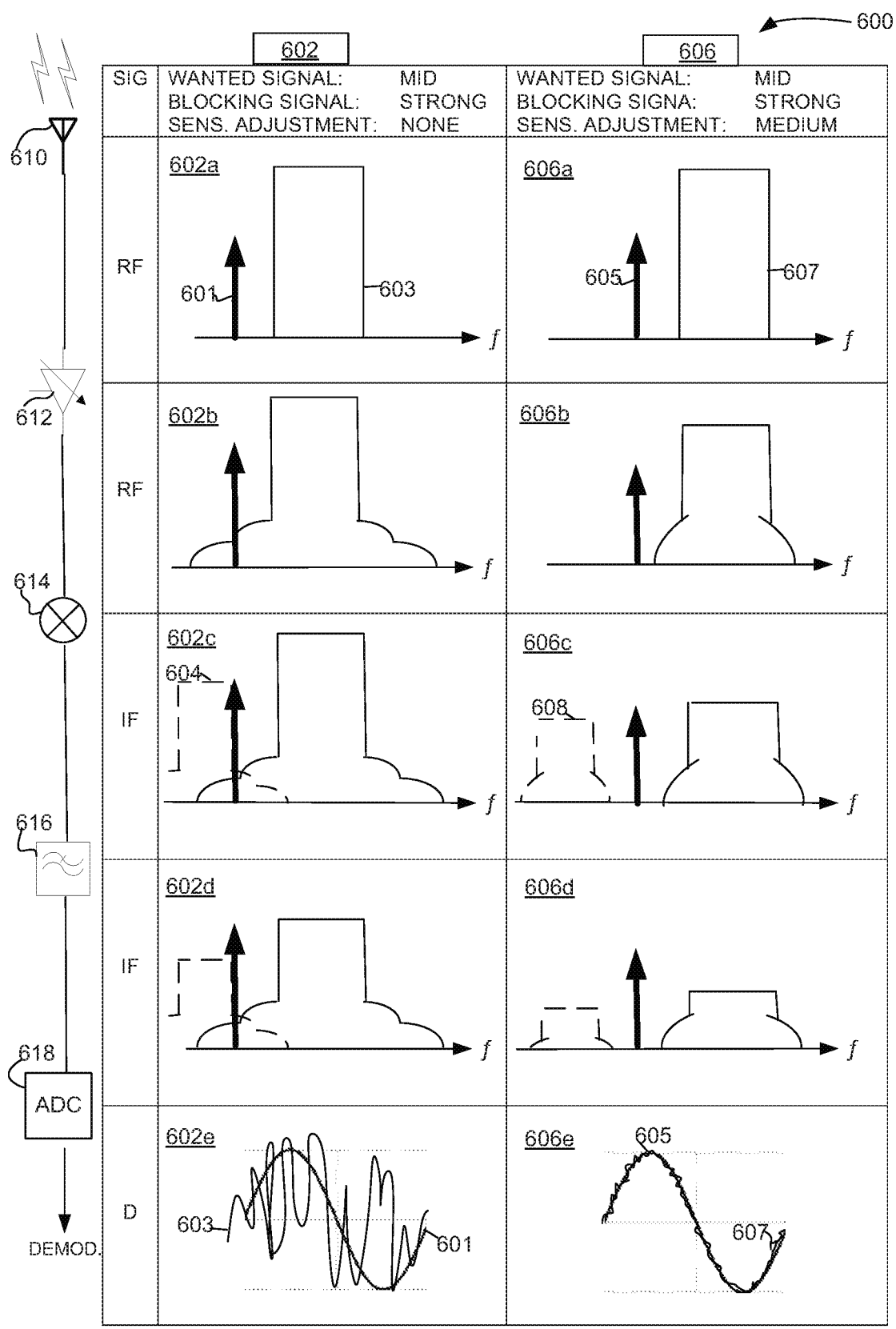
FIG. 6 is a table diagram comparing signal processing responses to a blocking signal with and without sensitivity adjustment, in accordance with embodiments.

FIG. 6 is a table diagram 600 comparing signal processing responses to a blocking signal with and without sensitivity adjustment, in accordance with embodiments. Column 602 shows the results of processing a wanted signal 601 and blocking signal 603 in an adjacent channel, without sensitivity adjustment. Column 606 shows the results of processing a wanted signal 605 and blocking signal 607 in an adjacent channel, with sensitivity adjustment. The receive circuitry is shown to include antenna 610, amplifier 612, mixer 614, filter 616, and ADC 618, which may be the same or similar as those described with respect to FIG. 3.

Reference to wanted signals 601 and 605 and blocking signals 603 and 607 apply to the signals in their various forms as they a processed by the analog and digital processing stages of receive circuitry. In embodiments, the signal level associated with wanted signals 601 and 605 is in the mid-range (e.g., both −50 dB) and the signal level associated with the blocking signals 603 and 607 is in the strong range (e.g., both −20 dB).

Box 602a shows the frequency response of an RF signal including the wanted signal 601 and the blocking signal 603 after reception by the antenna 610. Similarly, box 606a shows the frequency response of the RF signal including the wanted signal 605 and the blocking signal 607. At this stage the responses are identical.

Box 602b shows the frequency response of an RF signal including the wanted signal 601 and the blocking signal 603 after having been amplified by the amplifier 612. The frequency response in box 602b shows that an amplifier 612, whose gain has been set conventionally, causes frequencies of the blocking signal 603 that interfere with frequencies of the wanted signal 601. In contrast, box 606b shows that an amplifier 612, whose gain has been set based on a sensitivity adjustment value from the sensitivity adjustor 216 of FIG. 3, causes frequencies of the blocking signal 607 that do not interfere with the wanted signal 605.

Boxes 602c, 602d, and 602e show how frequency interference caused by conventionally amplifying the RF signal (e.g., shown in box 602b) is perpetuated through the receive circuitry. For example, in box 602c, the IF signal generated by the mixer 614 include the blocking signal 603 and an image 604 of the blocking signal 603 that interfere with the wanted signal 601. In box 602d, the filter 616 may reduce the amplitude of IF signal but filtering does not remove the interfering frequencies of the blocking signal 603 and image 604. Box 602e, shows digital data generated by the ADC 618 based on the filtered IF signal. The resulting combination of the blocking signal 603 and the wanted signal 601 in the digital data can make the wanted signal 601 unrecognizable causing phase estimation errors and/or demodulation errors that can ultimately cause packet reassembly errors. The presence of the blocking signal 603 for a period of time, without the sensitivity adjustments, can cause a significant increase in PER. The closer the blocking signal 603 channel is to the wanted signal 601 channel, the more harmful the blocking signal can be. Adjacent band blocking signals can also cause intermodulation and harmonic interference that cause packet errors.

Boxes 606c, 606d, and 606e show how amplifying the RF signal based on an adjusted gain, according to embodiments, can avoid frequency overlap (e.g., shown in box 606b) that would otherwise result from the blocking signal 607 (e.g., compare to box 602b). For example, in box 606c, the IF signal generated by the mixer 614 includes the blocking signal 607 and an image 608 of the blocking signal 607 that do not overlap with the wanted signal 605. In box 606d, the filter 616 reduces the amplitude of the IF signal and the blocking signal 607 (e.g., and its image 608) still do not overlap with the wanted signal 605. Box 606e, shows digital data generated by the ADC 618 based on the filtered IF signal represented in box 606d. In embodiments, the resulting digital data allows the wanted signal 605 to be recognizable, identifiable, and/or otherwise distinguishable from the blocking signal 607, which facilitates accurate phase estimation and/or demodulation that can ultimately reduce packet reassembly errors. In similar fashion, sensitivity adjustment values can be designed and used to mitigate intermodulation and/or harmonic interference (e.g., caused by adjacent band blocking signals).

Figure 7:
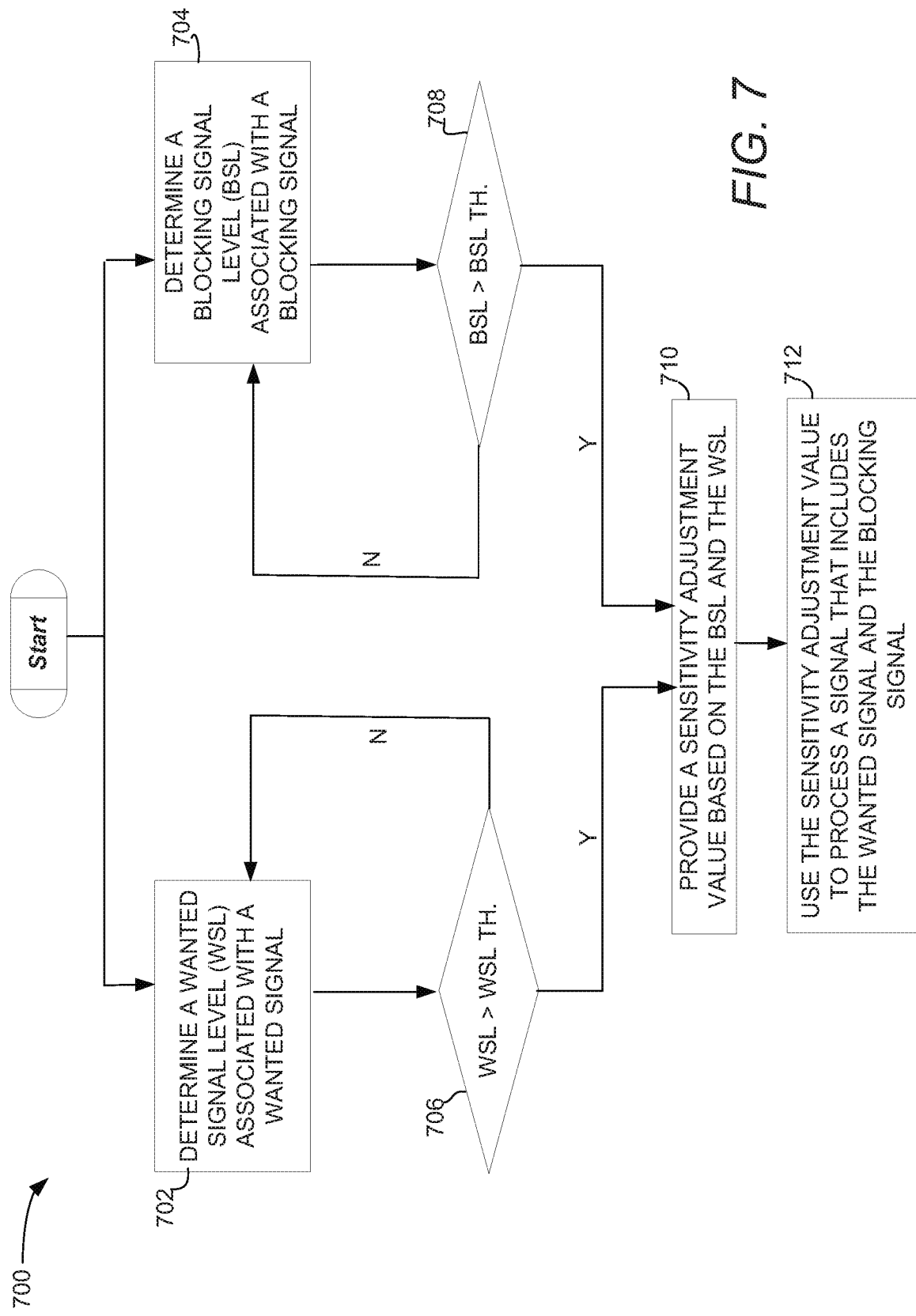
FIG. 7 is a flow diagram illustrating a method of providing a sensitivity adjustment, in accordance with embodiments.

FIG. 7 is a flow diagram illustrating a method 700 of providing a sensitivity adjustment, in accordance with embodiments. The method 700 can be performed by processing logic comprising hardware (circuitry, dedicated logic, etc.), software (such as is run on a general-purpose computing system or a dedicated machine), firmware (embedded software), or any combination thereof. In various embodiments, the method 700 may be performed as shown and described with respect to the multi-network device 102 as described with respect to FIG. 2 and further described with respect to FIG. 1 and FIGS. 3-6.

At block 702, the signal attribute detector 206 of the network communication circuitry 204 detects a wanted signal level associated with a wanted signal (e.g., an RSSI value of the wanted RF signals 108). At block 704, the signal attribute detector 232 of the network communication circuitry 230 detects a blocking signal level associated with a blocking signal (e.g., an RSSI value of the blocking RF signals 110).

At block 706, if the sensitivity adjustor 216 of the network communication circuitry 204 determines that the wanted signal level does not meet or exceed a blocking signal level threshold (e.g., in the weak range of FIG. 4), the method returns to block 702 where the signal attribute detector 206 detects the wanted signal level of a subsequently received portion of a wanted signal. Similarly, at block 708, if the sensitivity adjustor 216 determines that the blocking signal level does not meet or exceed a blocking signal level threshold, the method returns to block 704 where the signal attribute detector 232 detects the blocking signal level of a subsequently received portion of a blocking signal. In some embodiments, no sensitivity adjustment is made when any one of the blocking signal level and the wanted signal level fall below a predetermined threshold level.

If at block 706, the sensitivity adjustor 216 determines that the wanted signal level meets or exceeds the wanted signal level threshold (e.g., an RSSI value the mid or strong range in FIG. 4), and at block 708, the sensitivity adjustor 216 determines that the blocking signal level meets or exceeds the blocking signal level threshold, the method proceeds to block 710. At block 710, the sensitivity adjustor 216 uses the wanted signal level and the blocking signal level to provide a sensitivity adjustment value. For example, referring to FIG. 3, the sensitivity adjustor 216 of FIG. 3 may access the LUT 313 to provide the sensitivity adjustment value 322 causing the AGC logic 302 to apply a corresponding gain adjustment value to the amplifiers 304 and 306.

At block 712, the network communication circuitry 204 uses the sensitivity adjustment value to process a combined signal including the wanted signal and the blocking signal. As described with respect to column 606 FIG. 6, stages of the receive circuitry process the RF, IF, and digital signals, (e.g., each having components of the wanted signals and the blocking signals) so that the demodulator 320 of FIG. 3 can accurately demodulate the wanted signal 505 and the signal processor of FIG. 2 can reconstruct packets without error, avoiding the power consumption required to request and re-construct retransmitted packet.

Figure 8:
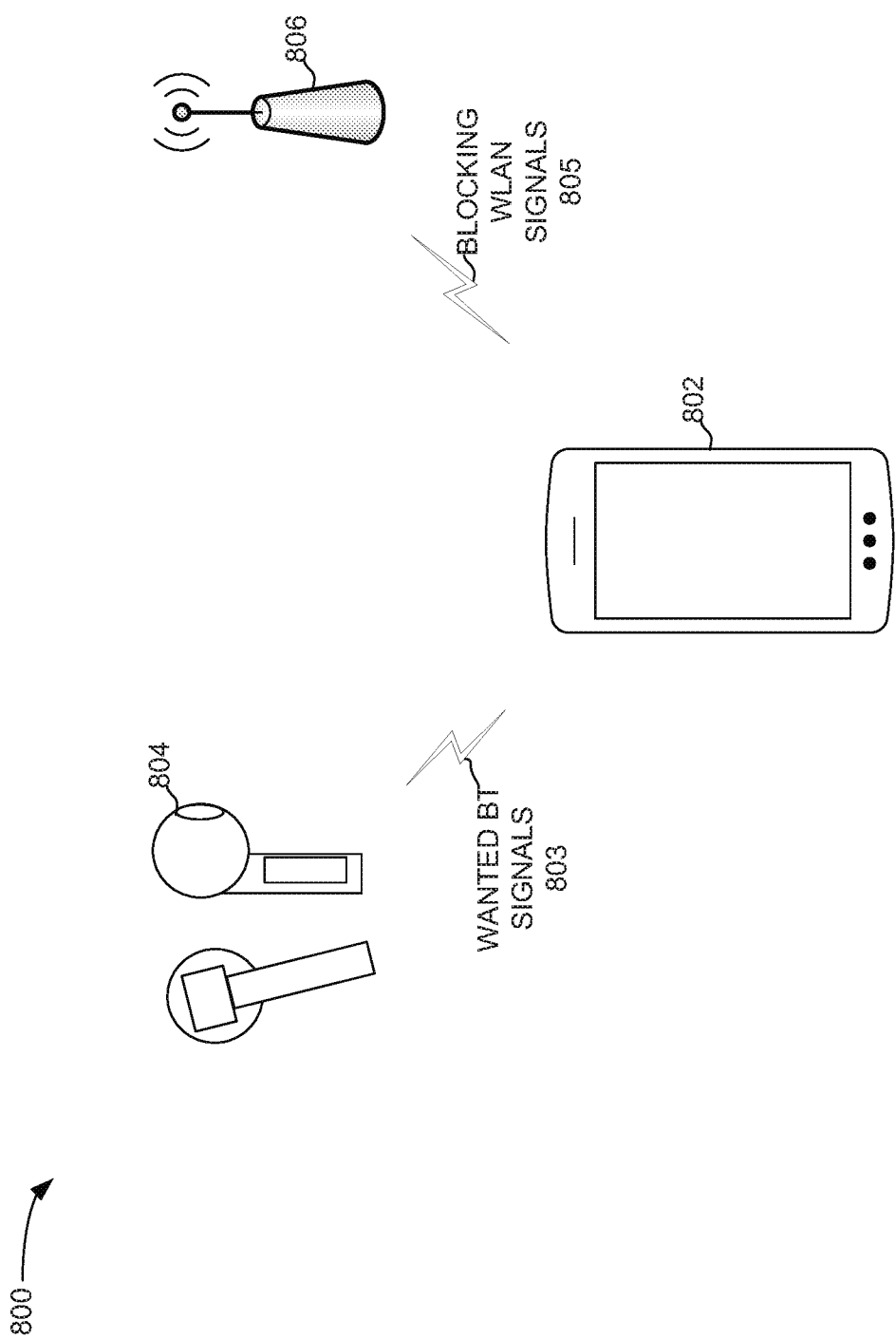
FIG. 8 is a schematic diagram illustrating a use case for adjusting receive sensitivity using collocated communication circuitry, in accordance with embodiments.

FIG. 8 is a schematic diagram illustrating a use case for adjusting receive sensitivity using collocated communication circuitry, in accordance with embodiments. In embodiments, the mobile device 802 includes a multi-network device 102 of FIG. 2 configured to communicate using the BT communication protocol and WLAN communication protocol. The earbuds 804 transmit wanted BT signals 803 to the mobile device 802. The wanted BT signals may include any data transmittable over BT (e.g., audio data, voice data, biometric data, connection data, etc.). The wireless access point 806 transmits blocking WLAN signals 805. During operation and use (e.g., stationary and mobile) of the mobile device 802 and each of the earbuds 804 and access point 806, the energies of the wanted BT signals and the blocking WLAN signal incident to the mobile device changes, which can have varying effects on PER associated with the wanted BT signal. The mobile device 802 can dynamically adjust its receive sensitivity to the wanted BT signal, as described herein, in order to avoid increased PER that would otherwise be caused due to the blocking WLAN signal.

Figure 9:
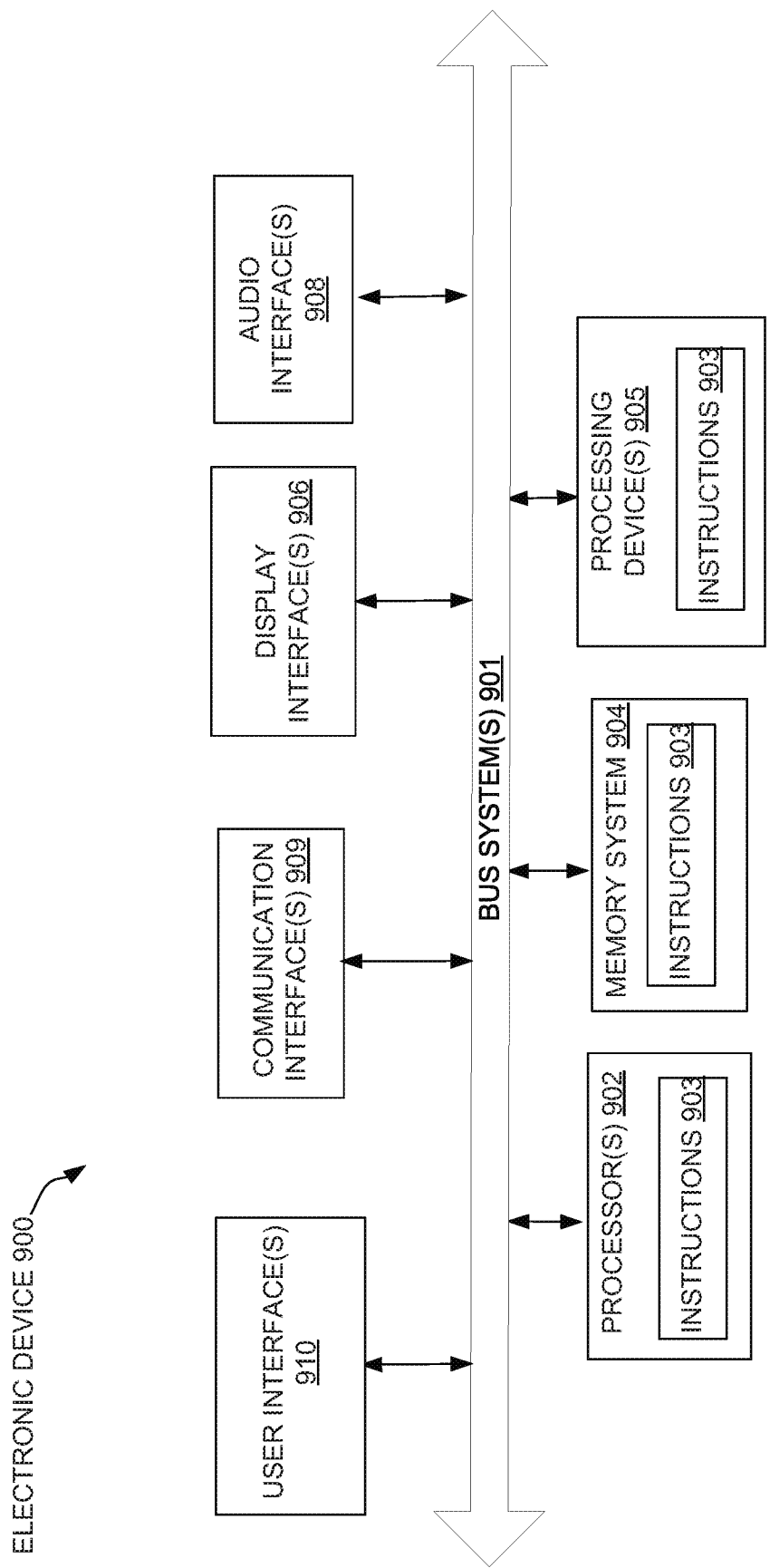
FIG. 9 is a block diagram illustrating an electronic device, in accordance with embodiments.

FIG. 9 is a block diagram illustrating an electronic device 900, in accordance with embodiments. The electronic device 900 may fully or partially include and/or operate the example embodiments of the multi-network device 102 or portions thereof as described with respect to FIGS. 1-8. The electronic device 900 may be in the form of a computer system within which sets of instructions may be executed to cause the electronic device 900 to perform any one or more of the methodologies discussed herein. The electronic device 900 may operate as a standalone device or may be connected (e.g., networked) to other machines. In a networked deployment, the electronic device 900 may operate in the capacity of a server or a client machine in server-client network environment, or as a peer machine in a P2P (or distributed) network environment.

The electronic device 900 may be an Internet of Things (IoT) device, a server computer, a client computer, a personal computer (PC), a tablet, a set-top box (STB), a voice controlled hub (VCH), a Personal Digital Assistant (PDA), a mobile telephone, a web appliance, a network router, switch or bridge, a television, speakers, a remote control, a monitor, a handheld multi-media device, a handheld video player, a handheld gaming device, or a control panel, or any other machine capable of executing a set of instructions (sequential or otherwise) that specify actions to be taken by that machine. Further, while only a single electronic device 900 is illustrated, the term "device" shall also be taken to include any collection of machines that individually or jointly execute a set (or multiple sets) of instructions to perform any one or more of the methodologies discussed herein.

The electronic device 900 is shown to include processor(s) 902. In embodiments, the electronic device 900 and/or processors(s) 902 may include processing device(s) 905 such as a System on a Chip processing device, developed by Cypress Semiconductor Corporation, San Jose, Calif. Alternatively, the electronic device 900 may include one or more other processing devices known by those of ordinary skill in the art, such as a microprocessor or central processing unit, an application processor, a host controller, a controller, special-purpose processor, digital signal processor (DSP), an application specific integrated circuit (ASIC), a field programmable gate array (FPGA), or the like. Bus system 901 may include a communication block (not shown) to communicate with an internal or external component, such as an embedded controller or an application processor, via communication interfaces(s) 909 and/or bus system 901.

Components of the electronic device 900 may reside on a common carrier substrate such as, for example, an IC die substrate, a multi-chip module substrate, or the like. Alternatively, components of the electronic device 900 may be one or more separate ICs and/or discrete components.

The memory system 904 may include volatile memory and/or non-volatile memory which may communicate with one another via the bus system 901. The memory system 904 may include, for example, random access memory (RAM) and program flash. RAM may be static RAM (SRAM), and program flash may be a non-volatile storage, which may be used to store firmware (e.g., control algorithms executable by processor(s) 902 to implement operations described herein). The memory system 904 may include instructions 903 that when executed perform the methods described herein. Portions of the memory system 904 may be dynamically allocated to provide caching, buffering, and/or other memory based functionalities.

The memory system 904 may include a drive unit providing a machine-readable medium on which may be stored one or more sets of instructions 903 (e.g., software) embodying any one or more of the methodologies or functions described herein. The instructions 903 may also reside, completely or at least partially, within the other memory devices of the memory system 904 and/or within the processor(s) 902 during execution thereof by the electronic device 900, which in some embodiments, constitutes machine-readable media. The instructions 903 may further be transmitted or received over a network via the communication interfaces(s) 909.

While a machine-readable medium is in some embodiments a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing or encoding a set of instructions for execution by the machine and that cause the machine to perform any one or more of the example operations described herein. The term "machine-readable medium" shall accordingly be taken to include, but not be limited to, solid-state memories, and optical and magnetic media.

The electronic device 900 is further shown to include display interface(s) 906 (e.g., a liquid crystal display (LCD), touchscreen, a cathode ray tube (CRT), and software and hardware support for display technologies), audio interface(s) 908 (e.g., microphones, speakers and software and hardware support for microphone input/output and speaker input/output). The electronic device 900 is also shown to include user interface(s) 910 (e.g., keyboard, buttons, switches, touchpad, touchscreens, and software and hardware support for user interfaces).

The above description is intended to be illustrative, and not restrictive. For example, the above-described embodiments (or one or more aspects thereof) may be used in combination with each other. Other embodiments will be apparent to those of skill in the art upon reviewing the above description. In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. In the event of inconsistent usages between this document and those documents so incorporated by reference, the usage in the incorporated reference(s) should be considered supplementary to that of this document; for irreconcilable inconsistencies, the usage in this document supersedes the usage in any incorporated references.

Although the claimed subject matter has been described with reference to specific embodiments, it will be evident that various modifications and changes may be made to these embodiments without departing from the broader spirit and scope of what is claimed. Accordingly, the specification and drawings are to be regarded in an illustrative rather than a restrictive sense. The scope of the claims should be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended; a system, device, article, or process that includes elements in addition to those listed after such a term in a claim are still deemed to fall within the scope of that claim. Moreover, in the following claims, the terms "first," "second," and "third," etc. are used merely as labels and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims.

What is claimed is:

1. A method of a wireless device, the method comprising:
   using first communication circuitry of the wireless device, determining a first signal level associated with a first radio frequency signal;
   using second communication circuitry of the wireless device, determining a second signal level associated with a second radio frequency signal;
   generating a sensitivity adjustment value based on the first signal level and the second signal level, wherein the generating of the sensitivity adjustment value comprises generating a gain adjustment value;
   using the sensitivity adjustment value, processing a combined signal comprising the first radio frequency signal and the second radio frequency signal, wherein the using of the sensitivity adjustment value comprises using the gain adjustment value, adjusting a gain applied to the combined signal; and
   demodulating the first radio frequency signal after the adjusting of the gain.

2. The method of claim 1, wherein the generating of the sensitivity adjustment value and the using of the sensitivity adjustment value comprises adjusting an existing receive sensitivity based on determining that the first signal level meets or exceeds a wanted signal level threshold and determining that the second signal level meets or exceeds a blocking signal level threshold.

3. The method of claim 1, wherein the generating of the gain adjustment value comprises accessing one or more data structures to determine a gain adjustment value associated with the determined first signal level and the determined second signal level.

4. The method of claim 1, wherein the generating of the gain adjustment value comprises computing the gain adjustment value using a gain adjustment equation.

5. The method of claim 1, wherein the adjusting the gain provided to the combined signal comprises providing the gain adjustment value to an automatic gain control circuit.

6. The method of claim 1, wherein the adjusting the gain provided to the combined signal comprises adjusting one or more gain values associated with one or more amplifier circuits.

7. The method of claim 1, further comprising:
   using the first communication circuitry of the wireless device, determining a third signal level associated with a third radio frequency signal;
   using second communication circuitry of the wireless device, determining a fourth signal level associated with a fourth radio frequency signal;
   generating another sensitivity adjustment value based on the third signal level and the fourth signal level; and
   using the other sensitivity adjustment value, maintaining an existing receive sensitivity based on determining that the third signal level does not meet a wanted signal level threshold or determining that the fourth signal level does not meet a blocking signal level threshold.

8. The method of claim 1, wherein the using of the first communication circuitry comprises using a first signal attribute detector configured to determine the first signal level of the first radio frequency signal transmitted according to a first network protocol communication via an industrial, scientific, and medical (ISM) frequency band and the using of the second communication circuitry comprises using a second signal attribute detector configured to determine the second signal level of the second radio frequency signal transmitted according to a second network protocol communication via the ISM frequency band.

9. The method of claim 8, wherein the first network protocol communication is selected from the group of protocol communications consisting of Zigbee communication, Wi-Fi communication, Bluetooth communication, and cellular communication.

10. The method of claim 1, wherein the determining the first signal level of the first radio frequency signal comprises receiving the first radio frequency signal through a first antenna and the determining the second signal level of the second radio frequency signal comprises receiving the second radio frequency signal through a second antenna.

11. Communication circuitry comprising:
a first signal attribute detector configured to determine a first signal level of a first radio frequency (RF) signal;
a second signal attribute detector configured to determine a second signal level of a second RF signal;
a receiver comprising, one or more amplifiers configured to receive a combined RF signal comprising the first RF signal and the second RF signal, and an automatic gain control logic coupled to the one or more amplifiers, the automatic gain control logic to control one or more gain values applied by the one or more amplifiers; and
a sensitivity adjustor configured to generate a sensitivity adjustment value based on the first signal level and the second signal level and to use the sensitivity adjustment value to adjust the sensitivity of the receiver, wherein the sensitivity adjustor is configured to provide the sensitivity adjustment value to the automatic gain control logic to vary the one or more gain values applied by the one or more amplifiers.

12. The communication circuitry of claim 11, wherein the first signal attribute detector is configured to determine the first signal level based on a Bluetooth signal received at a first antenna and wherein the second signal attribute detector is configured to determine the second signal level based on a wireless local area network signal received at a second antenna.

13. The communication circuitry of claim 11, wherein the first signal attribute detector and the receiver are disposed on first integrated circuit chip and the second signal attribute detector is disposed on a second integrated circuit chip.

14. The communication circuitry of claim 11, wherein the sensitivity adjustor is configured to make a determination that the first signal level meets or exceeds a first threshold level and that the second signal level meets or exceeds a second threshold level and generate the sensitivity adjustment value based on the determination.

15. A network device comprising:
Bluetooth communication circuitry disposed on a printed circuit board, the Bluetooth communication circuitry comprising receive circuitry and a sensitivity adjustor, wherein the sensitivity adjustor is configured to generate a first sensitivity adjustment value based on a first received signal strength indicator associated with a Bluetooth signal and a first received signal strength indicator associated with a wireless local area network (WLAN) signal, and to use the first sensitivity adjustment value to cause a first sensitivity of the receive circuitry to the Bluetooth signal, wherein the Bluetooth communication circuitry is configured to demodulate the Bluetooth signal to generate one or more Bluetooth packets.

16. The network device of claim 15, wherein the sensitivity adjustor is configured to generate a second sensitivity adjustment value based on a second received signal strength indicator associated with the Bluetooth signal and a second received signal strength indicator associated with the WLAN signal and to use the second sensitivity adjustment value to cause a second sensitivity of the receive circuitry to the Bluetooth signal.

17. The network device of claim 15, further comprising WLAN communication circuitry disposed on the printed circuit board, wherein the WLAN communication circuitry comprises a WLAN received signal strength circuitry to provide WLAN received signal strength indicators, wherein the WLAN communication circuitry is configured to transmit and receive WLAN packets.

18. The network device of claim 17, wherein the Bluetooth communication circuitry is disposed on a first integrated circuit chip that is coupled to the printed circuit board and the WLAN communication circuitry is disposed on a second integrated circuit chip that is coupled to the printed circuit board.

* * * * *